United States Patent [19]
Semola et al.

[11] 3,874,258
[45] Apr. 1, 1975

[54] KEYED ATTACHMENT DEVICE FOR VEHICLE WHEELS

[75] Inventors: Vincent J. Semola, Malibu; Kenneth C. Droesbeke, Anaheim, both of Calif.

[73] Assignee: Stallion Enterprises Inc., Los Angeles, Calif.

[22] Filed: May 21, 1973

[21] Appl. No.: 361,890

[52] U.S. Cl. ............ 81/121 R, 81/71, 85/45
[51] Int. Cl. ............ B25b 13/06, B25b 13/50
[58] Field of Search ............ 81/71, 90 C, 121 R; 85/9 B, 32 R, 45

[56] References Cited
UNITED STATES PATENTS
2,338,024  12/1943  Bugg .................. 81/121 R X
3,241,408   3/1966  McCauley ................. 81/71

FOREIGN PATENTS OR APPLICATIONS
110,624  4/1964  Czechoslovakia ............ 85/45

*Primary Examiner*—Al Lawrence Smith
*Assistant Examiner*—James G. Smith
*Attorney, Agent, or Firm*—Edward A. Sokolski

[57] ABSTRACT

A nut device used for retaining a wheel to the hub of a vehicle is coded in configuration so as to mate with a particular key member, it being difficult to unfasten the nut without this special key member. The coding of the nut device is implemented by means of a predetermined lobed configuration forming an inner wall of the head portion thereof in conjunction with a post formed in this head portion having a particular shape and dimension. The coding of the nut member head portion is matched by that of the associated key device which can be used to unfasten the nut member.

8 Claims, 12 Drawing Figures

PATENTED APR 1 1975　　3,874,258

KEYED ATTACHMENT DEVICE FOR VEHICLE WHEELS

This invention relates to a nut device for retaining automobile wheels to the hub of a vehicle, and more particularly to such a device having a predetermined coded key configuration.

The theft of automobile wheels and tires has posed a considerable problem, particularly in the case of expensive wheels such as chrome plated, MAG wheels and the like. With conventional types of wheel attachment nuts, it is relatively easy for a thief to jack up a parked auto and remove the wheels, or to remove the spare wheel.

In order to alleviate this problem, devices have been developed in the prior art to make it difficult or impossible to unfasten the wheel nuts utilized without a special key or tool. A device along these lines is described in U.S. Pat. No. 3,241,408 issued Mar. 22, 1966, L. D. McCauley. The device of this prior art patent comprises a nut member having an endless groove formed in the head portion thereof, this groove having a rectangular cross-section of a constant width and being of a predetermined coded configuration. The groove is formed so that it mates with a particular associated key member which is used to unfasten the nut. The device of this prior patent relies for its coding solely on the configuration and dimensions of the endless groove and thus is somewhat limited in its coding possibilities.

The device of the present invention is an improvement over that of the aforementioned patent in that it provides a pair of coding elements in the nut device and thus greatly multiplies the coding possibilities afforded so as to improve the security of the device. Further, the device of this invention tends to have greater strength and is less likely to break. This end result is achieved by utilizing an inner wall portion formed in the head of the nut device for the first coding element, and a post member formed in such head for the second keying element, various configurations and dimensions for each of these elements and combinations thereof being used in the coding.

It is therefore an object of this invention to provide a keyed nut device for a vehicle wheel affording greater security than similar prior art devices.

It is still another object of this invention to provide a keyed nut device for a vehicle wheel having a pair of coding elements which are combined to increase the coding possibilities available.

Other objects of this invention will become apparent as the description proceeds in connection with the accompanying drawings, of which:

Briefly described, the device of the invention comprises a nut member for securing a wheel to the hub of a vehicle, this nut member having a head portion which is formed in a predetermined coded configuration. The coding is carried in two elements of the head member, the first of these comprising an inner wall portion and the second of these comprising a post portion. The inner wall and post portions are shaped and dimensioned in predetermined configurations such that only a key member having a configuration which mates with these predetermined configurations can be used to unfasten the nut member. Various combinations of configurations and dimensions for the wall and post portions can be used to provide a great variety of key codes.

Figure 1:
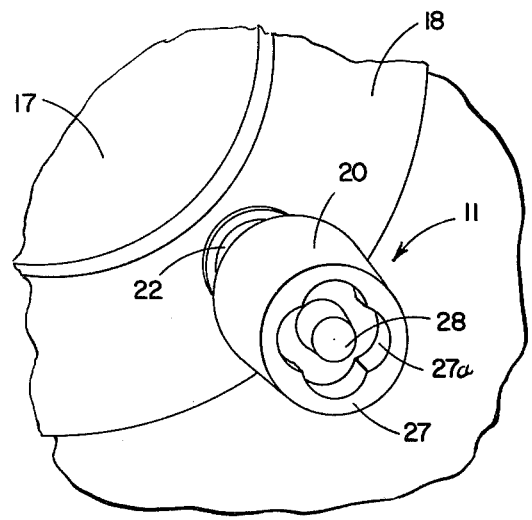
FIG. 1 is a perspective view illustrating one embodiment of the invention being used for attaching a vehicle wheel to a Wheel hub.
Figure 2:
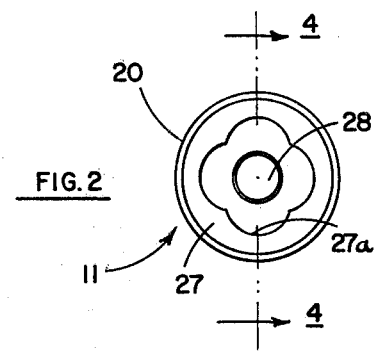
FIG. 2 is a top plan view of the nut device shown in FIG. 1.
Figure 3:
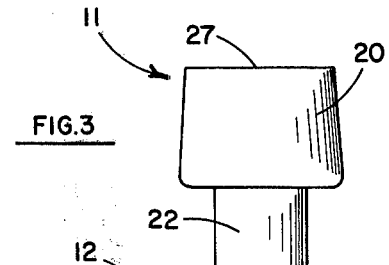
FIG. 3 is a side elevational view of the nut device of FIG. 1.
Figure 4:
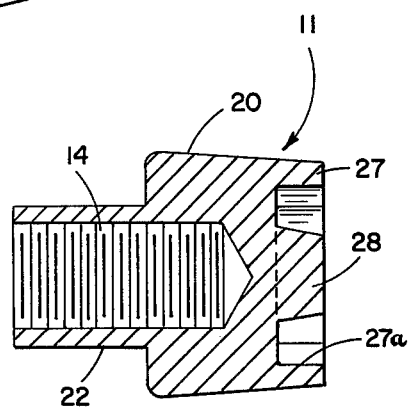
FIG. 4 is a cross sectional view taken along the plane indicated by 4—4 in FIG. 2.

Referring now to FIGS. 1–4, one embodiment of the device of the invention is illustrated. As shown in FIG. 1, nut member 11 has a threaded portion 14 (see FIG. 4) which threadably engages the wheel hub studs (not shown) to retain wheel 18 on wheel hub 17. Nut device 11 has a head portion 20, the sides of which are frusto-conically shaped to make it difficult to engage the nut member with a conventional pipe wrench or pliers, and a cylindrical base portion 22 which is of a lesser diameter than the head portion. Head portion 20 has a top face in which a wall 27 is formed. Inner wall surface 27a of wall 27 is contoured in a predetermined coded configuration, which in this instance comprises four lobes. The face of the head portion 20 also includes a post 28 which for the illustrative embodiment is centrally located and frusto-conically shaped. The coding for the particular configuration of the illustrative embodiment can be varied by changing the dimensions of post 28 and of wall surface 27a, as well as by varying the shapes of these two portions.

Figure 5:
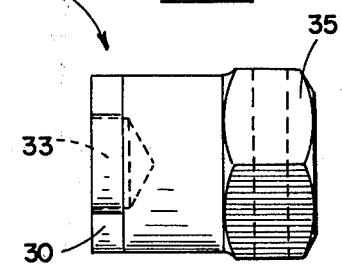
FIG. 5 is a side elevational view illustrating a keying device which may be utilized to unfasten the nut shown in FIGS. 1–4.
Figure 6:
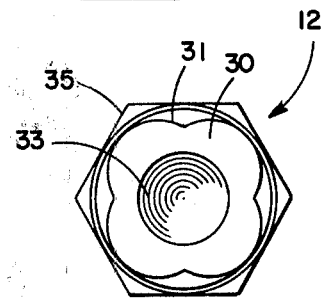
FIG. 6 is a bottom plan view of the key device of FIG. 5.

Referring now to FIGS. 5 and 6, a key device 12 which can be used to operate the nut member 11 of FIGS. 1–4 is illustrated. As can be seen, this key device has a wall portion 30 which fits between post 28 and the wall 27 of the nut member, with the outer surface 31 of wall portion 30 in engagement with the wall surface 27a of the nut member. Key device 12 further has an aperture 33 formed therein which fits snugly over post 28 of the nut member. A conventional hexagonal head 35 is provided on the key device to enable operation of the key device with a conventional socket wrench. It thus can be seen that nut member 11 can only be operated to attach and detach the nut member to and from a wheel hub stud by means of an appropriate mating key device 12.

As already noted, various arrangements and configurations for center post 28 and wall 27 can be utilized to provide a great variety of keying code configurations. Examples of such arrangements and configurations are shown in FIGS. 7–12, these FIGS. being top plan views of the head portion of the nut member of the invention.

Figure 7:
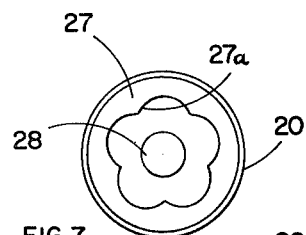
FIG. 7 is a top plan view illustrating an alternate head configuration for the device of the invention.

FIG. 7 illustrates a configuration in which post portion 28 has the same configuration as that of the embodiment shown in FIG. 1, but the inner surface 27a of wall 27 has a five-lobed configuration rather than the four lobes of the first described embodiment.

Figure 8:
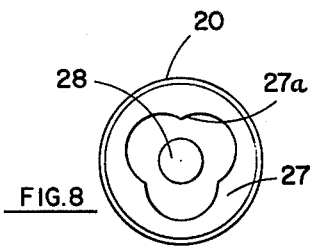
FIG. 8 is a top plan view of still another head configuration for the device of the invention.

FIG. 8 shows a configuration wherein post portion 28 is the same as that of FIG. 7 but in which wall surface 27a has only three lobes.

Figure 9:
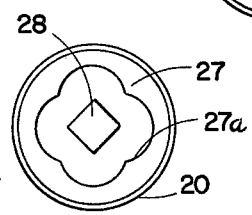
FIG. 9 is a top plan view of still a further configuration for the head of the device of the invention.

FIG. 9 illustrates a configuration wherein post portion 28 is square in shape, wall surface 27a having four lobes as for the first described embodiment.

Figure 10:
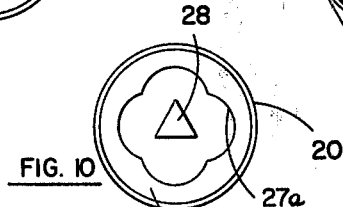
FIG. 10 is a top plan view illustrating still a further configuration for the head portion of the nut device of the invention.

FIG. 10 illustrates an embodiment in which post portion 28 is triangular with surface 27a having the same configuration as that of the first embodiment.

Figure 11:
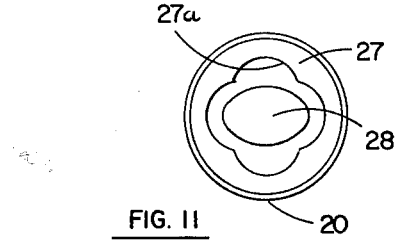
FIG. 11 is a top plan view of still another configuration of the head portion of the device of the invention.

FIG. 11 illustrates a configuration in which post 28 is elliptical in shape, wall surface 27a being the same as in the first embodiment.

Figure 12:
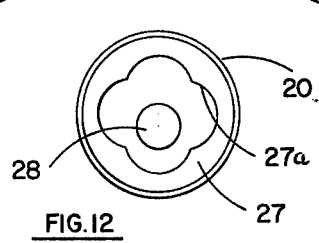
FIG. 12 is a top plan view of still a further head configuration of the device of the invention.

FIG. 12 illustrates a configuration in which the post portion 28 is of the same shape as the first embodiment, as is wall surface 27a. However, in this embodiment post portion 28 is offset from the center of the head, thus providing another manner in which the keying code can be implemented. It is to be noted that additional keying codes can be provided by offsetting any of the different geometrically shaped post portions 28 of FIGS. 9-11 from their central positions.

Thus it can be seen that a great variety of keying codes can be implemented in the device of the invention by varying the shapes and dimensions of both the inner wall 27a as well as the shapes, dimensions and positioning of post 28 relative to inner wall surface 27a.

The device of this invention thus provides an improved security nut member for retaining vehicle wheels in which a great variety of coding combinations are afforded by virtue of combined configurations, dimensions and relative positioning for post and wall elements of the head portion of a nut member.

While the device of the invention has been described and illustrated in detail, it is to be clearly understood that this is intended by way of illustration and example only and is not to be taken by way of limitation, the spirit and scope of this invention being limited only by the terms of the following claims.

We claim:

1. A keyed attachment nut for fastening a wheel to the hub of a vehicle, said hub having threaded studs extending therefrom, said nut being operable by a mating key device, said nut comprising:
    a base portion having a threaded aperture formed therein for engagement with the threaded portion of one of said studs, and
    a head portion having a top face, said face having a wall formed therein having an inner surface contoured in the form of a plurality of arcuate lobes providing a first predetermined coded configuration and a post formed therein in a second predetermined coded configuration, the spacing between the outer wall of the post and said inner wall surface forming a channel of non-uniform width therebetween,
    said key device having a wall portion which fits between the wall and post of said head portion in mating engagement with the inner surface of said head portion, said key device further having an aperture formed therein which fits snugly over the head portion post,
    whereby said key device can be utilized to rotatably drive said nut.

2. The combination of claim 1 wherein the base portion is cylindrical and is of a lesser diameter than the head portion, said head portion being frusto-conically shaped.

3. The combination of claim 1 wherein said post has a frusto-conical shape.

4. The combination of claim 3 wherein said post is located in the center of the face of the head portion.

5. The combination of claim 3 wherein said post is offset away from the center of the face of the head portion.

6. The combination of claim 1 wherein the post has an elliptical shape.

7. The combination of claim 1 wherein the post has a square shape.

8. The combination of claim 1 wherein the post has a triangular shape.

* * * * *